(No Model.) 4 Sheets—Sheet 1.

R. SOLANO.
POWER BRAKE.

No. 360,179. Patented Mar. 29, 1887.

WITNESSES:
A. Keeling
W. W. Weston

INVENTOR
Renaldo Solano
BY
Chas. W. Dorkus
ATTORNEY (No Model.) 4 Sheets—Sheet 2.

R. SOLANO.
POWER BRAKE.

No. 360,179. Patented Mar. 29, 1887.

WITNESSES:

INVENTOR
BY
ATTORNEY (No Model.) 4 Sheets—Sheet 3.

R. SOLANO.
POWER BRAKE.

No. 360,179. Patented Mar. 29, 1887.

WITNESSES:
A. Loveling
W. W. Weston

INVENTOR
Rinaldo Solano
BY
Chas. N. Forbes
ATTORNEY (No Model.) 4 Sheets—Sheet 4.
R. SOLANO.
POWER BRAKE.
No. 360,179. Patented Mar. 29, 1887.
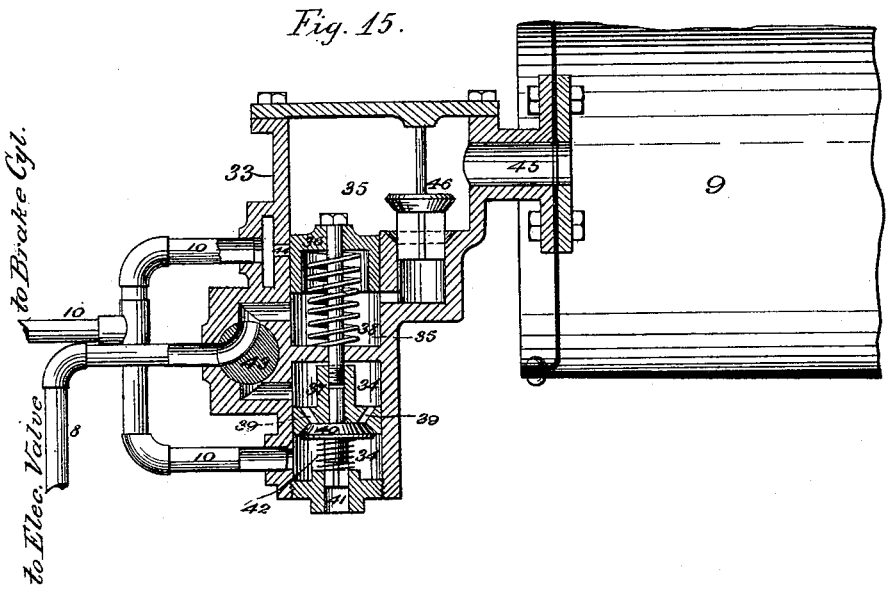
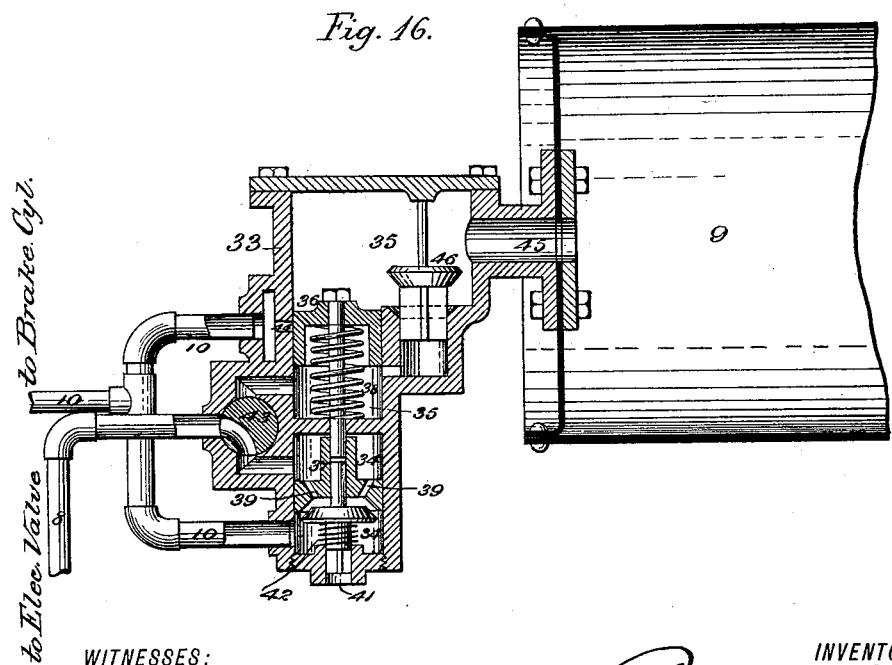
WITNESSES:
INVENTOR
Ronaldo Solano
BY
Chas. N. Forbes
ATTORNEY

UNITED STATES PATENT OFFICE.

RENALDO SOLANO, OF BROOKLYN, NEW YORK, ASSIGNOR OF TWO-THIRDS TO JOHN W. HOWARD AND DAVID R. MORSE, BOTH OF SAME PLACE.

POWER-BRAKE.

SPECIFICATION forming part of Letters Patent No. 360,179, dated March 29, 1887.

Application filed December 15, 1886. Serial No. 221,690. (No model.)

*To all whom it may concern:*

Be it known that I, RENALDO SOLANO, a citizen of the United States, residing at the city of Brooklyn, county of Kings, State of New York, have invented certain new and useful Improvements in Power-Brakes, of which the following is a specification, reference being had to the accompanying drawings, in which like figures of reference indicate like parts, and in which—

Figure 1:
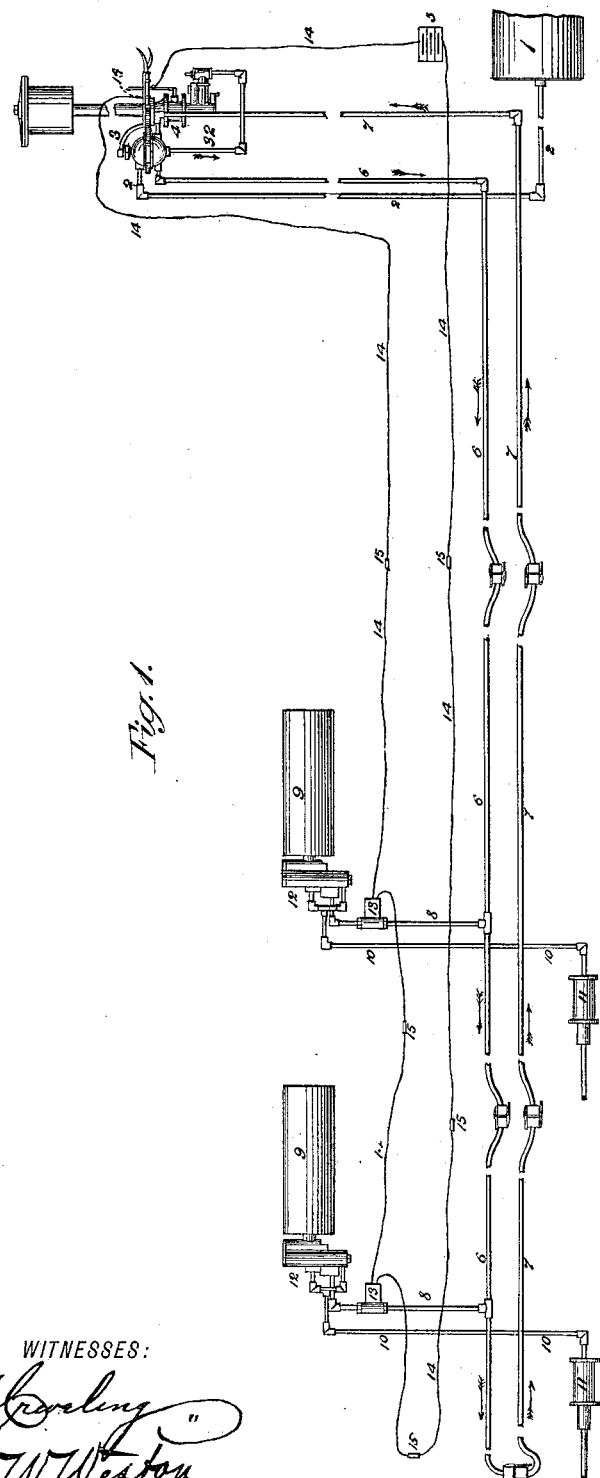
Figure 2:
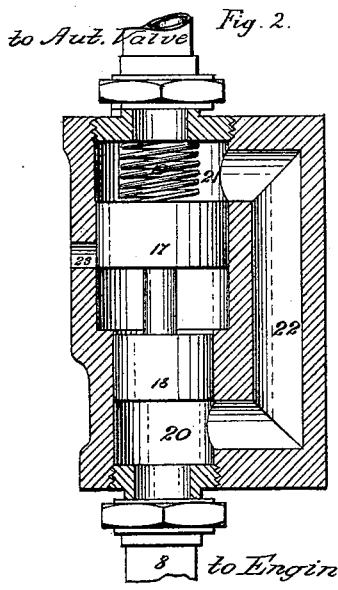
Figure 4:
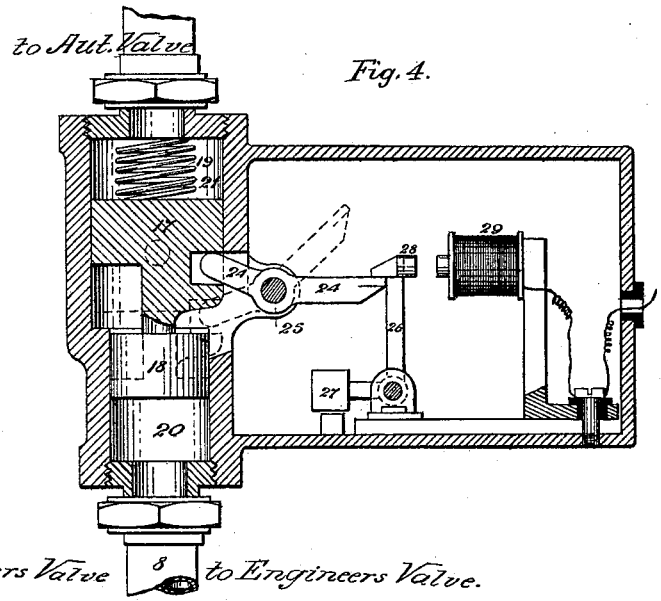
Figure 3:
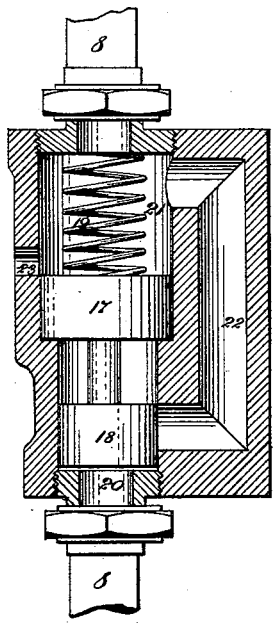
Figure 5:
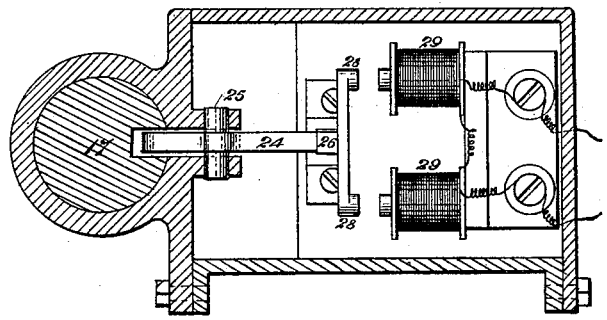
Figure 7:
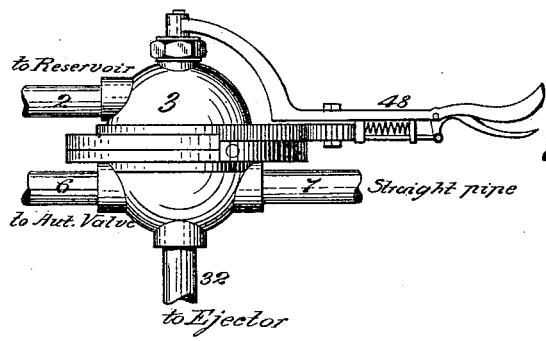
Figure 6:
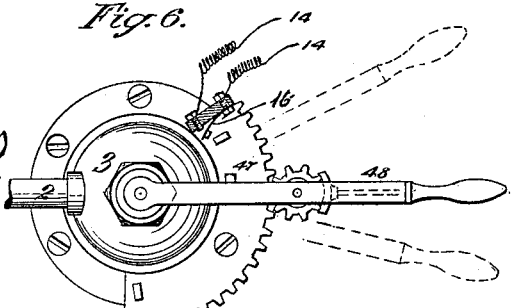
Figure 8:
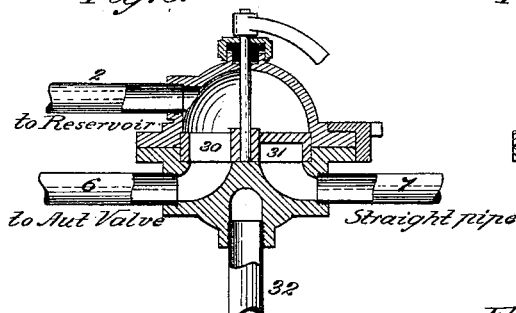
Figure 9:
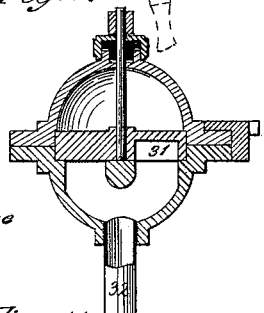
Figure 10:
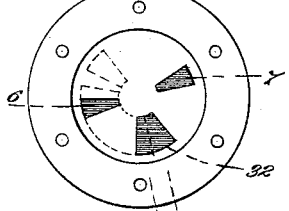
Figure 11:
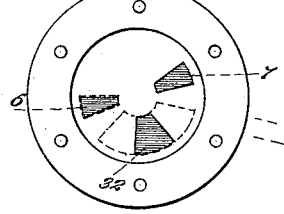
Figure 12:
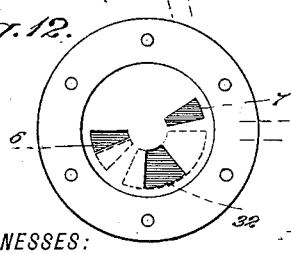
Figure 13:
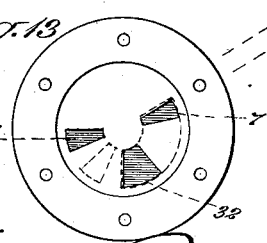

Figure 1 is a diagram of an apparatus illustrating the application of my invention; Fig. 2, an enlarged sectional detail view of an electrical relief-valve, shown out of action; Fig. 3, a similar view of the same in action; Fig. 4, a vertical section at right angles to Figs. 2 and 3, and Fig. 5 a horizontal section of the same; Fig. 6, a detail plan view of the engineer's operating-valve, showing upon it the position of an electric-circuit key for tripping the electric relief-valve; Figs. 7 to 14, inclusive, various detail views of said operating-valve; Fig. 15, a sectional detail view of automatic valves interposed between an auxiliary reservoir and brake-cylinder set for automatic brake action, and Fig. 16, a similar view of the parts set for direct brake action.

The present improvements are applicable to automatic pressure-brakes operated either by compressed air or other elastic fluid, and my object is to apply the power reserved for automatic action simultaneously from the several auxiliary reservoirs throughout the train independently of the train-pipes, to effect a construction which will render the apparatus readily convertible from an automatic braking system to a direct pressure system, and to combine the said features with an arrangement of train-pipes, by which, in event of failure of action of the simultaneous braking devices, will take first effect upon the rear of the train; and to enable others to understand and use my invention I will proceed to describe the novel features of the same in its application to systems and devices which I have described in a separate application, filed December 7, 1886, No. 220,886, and also in Letters Patent No. 353,175, dated November 23, 1886.

In the drawings, Fig. 1, 1 is the main compression-reservoir; 2, the supply-pipe; 3, the engineer's operating-valve; 4, the ejector; 5, an electric battery, all suitably located upon the locomotive; 6 and 7, the train-pipes; 8, the auxiliary-reservoir pipes; 9, the auxiliary reservoirs; 10, the brake-cylinder pipes; 11, the brake-cylinders; 12, the interposed automatic-valve systems; 13, the electric relief-valve; 14, the electric-circuit wires, having couplings 15 at the intersection of the cars, and 16 the key for making and breaking the circuit.

The electric relief-valves, Figs. 2 to 5, inclusive, consist of a double piston-valve having pistons 17 and 18, of large and small diameters, respectively, and a spring, 19, tending to depress said pistons.

The lower chamber, 20, of the valve-casing is connected to the upper chamber, 21, by the port 22, which is controlled by the piston 18. An escape-port, 23, is controlled by the piston 17, communicating the chamber 21 to the atmosphere when the valve is depressed and the connecting-port 22 closed. 24 is a sustaining-lever playing in a recess of piston 17, pivoted at 25, and sustaining the valve when engaged with the trip-lever 26, having a weight or equivalent, 27, and bearing an armature, 28, in front of the magnets 29, the same being magnetized when the key 16 on the engineer's operating-valve closes the circuit.

Figure 14:
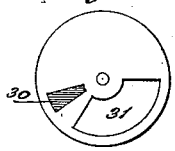

The construction of the engineer's operating-valve (shown in the present instance) having been fully described in my separate application, I will refer only to Figs. 10, 11, 12, and 13, which show the ports of the valve-seat designated by numbers corresponding to the pipes with which they are connected, and by dotted lines the various positions of the charging-port 30 and exhaust-channel 31 of the valve thereon, Fig. 14, the latter being an inverted view.

With reference to Figs. 15 and 16, the valve-casing 33 has two separate chambers, 34 35, in which the connected piston-valves 36 37 reciprocate. These valves are held in the position shown by means of the spiral spring 38. The piston-valve 37 is supplied with ports 39, that are opened and closed by a valve, 40, that also opens and closes the outlet 41 by means of its depending stem, as shown, the valve being normally held in closed position by the spring 42. The relative open and closed position of the valve 40 with respect to the positions of the piston-valves 36 37 is shown in Figs. 15 and 16. The pipe 8, connecting through the interposed electric valve with the train-pipes, is provided at its entrance with a shifting-cock, 43, which may be turned by a suitable key, so as to connect said pipe 8 with the chamber 35, below the piston-valve 36, or alternatively with the chambers 34 of the piston-valve 37. The branches of the brake-cylinder pipe connect, as shown, with the chamber 34, below the piston-valve 37, and port 44, controlled by the piston-valve 36. The auxiliary reservoir 9 communicates with the chamber 35 through the passage 45, and when the cock 43 is in the position shown by Fig. 15 is charged with air, that is reserved to operate the parts when the brake is applied automatically by exhaustion of air through the pipe 8. 46 is a check-valve in the supply-passage to the reservoir 9, that prevents the return of the air from said reservoir when charged.

Having thus described the various parts essential to the practice of my invention, their relative operation is as follows: The main reservoir 1 having been charged by the usual means and the cocks 43 of the automatic braking-valves set to the position shown by Fig. 15, the operating-valve 3 is, for the purpose of charging the auxiliary reservoirs, turned to the position indicated by Fig. 11, opening communication from reservoir 1 to the train-pipe 6, thence to and through the electric valves, setting them to the position shown by Fig. 2, thence into the chamber 35, Fig. 15, lifting the check-valve 46, equalizing pressure upon either side of piston-valve 36, whereby its spring 38 forces it up, closing the port 44, thus charging the reservoir 9 with a reserve pressure, to act to set the brakes in case of rupture to the train-pipes. This reserved force is utilized to set the brakes in connection with the principal feature of my invention—namely, the interposed relief-valves 13, the same being tripped simultaneously throughout the train by agency of the electrical circuit, which is closed at the instant when pressure is released from the train-pipes. In order to set the brakes, the operating-valve 3 is moved to the position shown by Fig. 13, releasing the compressed air of the train-pipes through the pipe 7 to the ejector, which would, in the absence of the electric appliance, brake the rear of the train first; but the closing of the key 16 by contact of the button 47 on the lever 48, Fig. 6, releases the trip mechanism of all the valves 13, causing them to depress simultaneously, cutting off communication to the ejector and leaving the passage 23 open to release pressure and actuate the automatic braking-valves 12. The pressure now released from beneath the piston-valve 36, Fig. 15, and check-valve 46, will cause the closing of said check-valve and force the connected piston-valves 36 37 downward, which closes the escape-opening 41 and opens the port 44, thus allowing the air from the reservoir 9 to enter the pipe 10 into the brake-cylinder, thus setting the brake. Upon shifting the operating-valve to the position indicated by Fig. 11 the compression of air charged into the train-pipes will reset the electric valves, raise the piston-valves 36 37, Fig. 15, closing the port 44 and opening the passage 41, which will allow the air-pressure to escape from the brake-cylinder and release the brakes.

When it is desired to apply the brakes by the direct system, the cock 43 is altered to the position shown by Fig. 16, the auxiliary reservoirs and the electric devices in this case being out of use. The brakes may now be set when the operating-valve is turned in the charging position shown by Fig. 11, allowing the compressed air from the main reservoir to flow through the train-pipes and passage 22 in the valves 13, irrespective of said valves, through the lower inlet of the cock 43 into the chamber 34 and ports 39, the valve 40 being forced from its seat, which closes the escape-opening 41 and allows the pressure to continue through the pipe 10 to the brake-cylinder. The release is effected by moving the operating-valve to the position of Fig. 10. The pressure being now relieved from the pipes 8, the back-pressure in the brake-cylinder closing the valve 40 will allow the air to escape through the opening 41.

It is manifest that the relief-valves 13 are equally applicable to pressure-brake cylinders of the construction which I have shown in the application referred to, filed simultaneously herewith, the innermost chambers of said cylinders being the equivalent as to function to the auxiliary reservoirs in the present apparatus, the automatic valves operating similarly in each case; hence

What I claim, and desire to secure by Letters Patent, is—

1. In a power-brake apparatus, the combination, with a brake-actuating cylinder, chamber for storage of reserved pressure, automatic valves for causing the action of said reserved pressure upon said cylinder by the relief of pressure from the train-pipes, of a relief-valve interposed between said automatic valves and train-pipes, and actuated by pressure, as described, when released by an electro-magnet trip mechanism.

2. In a pressure-brake system having auxiliary storage-chambers for actuating the brakes upon relief of pressure from an external system of chambers or pipes, the combination of relief-valves constructed as described and interposed in the line of communication of said external system to a means of pressure-relief, and actuated simultaneously with said pressure-relief by agency of an electric magnetizing-circuit and tripping mechanism, substantially as described.

3. In a pressure-brake apparatus having auxiliary storage-chambers for actuating the brakes upon relief of pressure from an external system of chambers or pipes, the combination, substantially as described, with said external system, of relief-valves, the same consisting of a valve-casing having a relief-port, an auxiliary passage, a double piston-valve controlling said ports, and an electro-magnet trip mechanism, substantially as described.

4. In a power-brake apparatus, the combination, with a main reservoir, brake-cylinder, and auxiliary reservoir having two separate valve-chambers, substantially as described, of a shifting-cock communicating with either of said valve-chambers from a common charging and exhausting pipe, whereby pressure is directly applied to and released from the brake, or automatically by a reserved pressure, the latter being subject to application in the event of accident, or at the will of the engineer.

RENALDO SOLANO.

Witnesses:
CHAS. W. FORBES,
A. CREVELING.